United States Patent [19]

Enari et al.

[11] Patent Number: 4,811,321
[45] Date of Patent: Mar. 7, 1989

[54] INFORMATION RECORDING MEDIUM

[75] Inventors: Masahiko Enari, Yokohama; Akio Aoki, Tokyo; Hideki Hosoya, Yokohama, all of Japan

[73] Assignee: Canon Kabushiki Kaisha, Tokyo, Japan

[21] Appl. No.: 208,802

[22] Filed: Jun. 20, 1988

Related U.S. Application Data

[63] Continuation of Ser. No. 830,748, Feb. 19, 1986, abandoned.

[30] Foreign Application Priority Data

Feb. 20, 1985 [JP] Japan .................... 60-031868

[51] Int. Cl.⁴ .................... G11B 20/10; G11B 5/09
[52] U.S. Cl. .................... 369/59; 360/49
[58] Field of Search .................... 369/59; 360/49

[56] References Cited

U.S. PATENT DOCUMENTS 4,566,091 1/1986 Gerard et al. .................... 369/59

Primary Examiner—Vincent P. Canney
Attorney, Agent, or Firm—Fitzpatrick, Cella Harper & Scinto

[57] ABSTRACT

An information recording medium includes: a plurality of information tracks for storing information to be recorded; a first area for separating and discriminating an information track from another information track adjacent to the information track in the direction of information sequence; and a second area for separating and discriminating the information track from another information track adjacent to the information track in the direction perpendicular to the direction of information sequence, the second area having a common portion to the first area.

7 Claims, 5 Drawing Sheets

INFORMATION RECORDING MEDIUM

This application is a continuation of application Ser. No. 830,748 filed Feb. 19, 1986, now abandoned.

BACKGROUND OF THE INVENTION

The present invention relates to an information recording medium.

Recently, various optical recording and reproducing apparatus using a recording medium such as an optical file and compact disc have been proposed. Also, a card type optical recording medium (hereinafter called optical card) and a method of using the same have been proposed, which is superior in portability and relative in memory capacity to those of the above-noted apparatus.

FIG. 1 schematically shows a plan view of a record format of a conventional optical card. In the figure, formed on an optical card 1 used as a recording medium is a recording area 2, which is constituted by a plurality of bands 3. Each band 3 is constructed of a plurality of sets, one set including a track 4, and start bit and stop bit to be described later. The track 4 has an information capacity of about several fens to 100 bits. Each band is partitioned by a reference line (hereinafter called R line). The arrow A indicates the direction of movement of the optical card 1 during reproduction.

FIG. 2 schematically shows the construction of an optical reproducing apparatus. In the figure, the optical card 1 is movable in the direction of the arrow A by means of a rotary mechanism 6. Information recorded on the optical card 1 is read with an optical head 11 and reproduced respectively for each track. In particular, light from a light source 7 such as an LED is focussed by an optical lens system 8 to apply it onto a certain track on which information has been recorded An image from the light-applied track 4 is focussed onto a linear sensor array 10 by an optical focussing system 9, so that an electrical signal corresponding to the information recorded on the track 4 is outputted from the sensor array 10. After completion of the readout of the track 4, the optical card 1 is moved in the direction of the arrow A or the optical head 11 is moved in the direction of juxtaposition of the bands 3 (i.e., in the direction of the arrow C), to further process the next information readout from the track 4.

FIG. 3 schematically shows an enlarged portion of the conventional record format shown in FIG. 1. Hatched portions indicate an information "1". In the figure, on opposite sides of the information track 4, there are formed a start bit 21 indicating the start of the information track 4 and a stop bit 22 indicating the end of the information track. Both bits are opposite to each other in optical characteristic (i.e., if one bit information is "1" then the other is "0"), and are inverted in optical characteristic for each adjacent track. The R line 5 has two bits and is disposed in the form of a stripe across the bands 3. The readout operation of the information track 4 by the sensor array 10 is initiated upon detection of a separating area information "001100" including two bits of the R line 5. At the start of reading of the information track 4 the start bit 21 information is stored, and after the end of reading of the information track 4 the stop bit 22 information is stored. Thus, since both bit informations are inverted for each adjacent track, it is possible to recognize a start of reading of a new information track by the sensor array 10. Such a method for detecting a new information track becomes necessary when one information track is scanned plural times by the sensor array 10 while the scanning of the sensor array 10 and the movement of the optical card are carried out asyhchronously The conventional record format has some problems. There is quite a possibility that the information track may contain the same information as that of the separating area including the R line information (in this example, "001100"); and the detection of the R line and the discrimination between information tracks are degraded in accuracy.

Further, since the start and stop bits are essential to the conventional record format, if the number of bits within one track is small, the ratio of the number of start and stop bits to the whole number of bits within one band becomes large. Therefore, the information storage capacity is reduced.

SUMMARY OF THE INVENTION

It is an object of the present invention to provide an information recording medium without reduction of the information storage capacity.

It is another object of the present invention to provide an information recording medium capable of reliably discriminating between information tracks.

According to one aspect of the present invention, the information recording medium is provided with a portion common to both areas, one area being for separating and discriminating a desired information track from another information track adjacent to the desired information track in the direction of information sequence, and the other area being for separating and discriminating a desired information track from another information track adjacent to the desired information track in the direction perpendicular to that of information sequence Other aspects of the present invention will become apparent from the following description.

DESCRIPTION OF THE PREFERRED EMBODIMENT

Figure 4:
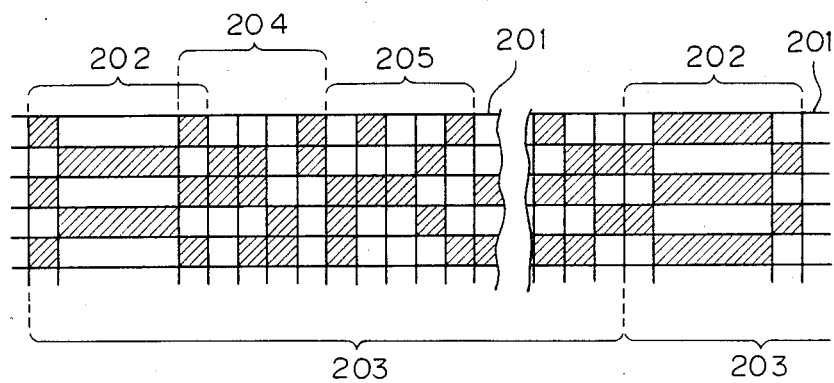
FIG. 4 schematically shows an embodiment of a record format of the information recording medium according to the present invention.

The preferred embodiment of the present invention will now be described in detail with reference to the accompanying drawings FIG. 4 schematically shows the embodiment of a record format of the information recording medium according to the present invention. In the Figure, an information track 201 is separated by a separating area 202 from another information track adjacent to the information track 201 in the direction of bit sequence thereof. A band 203 is constructed of a plurality of tracks, each track having an information track 201 and a separating track 202. A plurality of bands 203 are also disposed in columns. The column (vertical direction in FIG. 4) made of the separating areas within a band 203 serves as an R line for separating adjacent information tracks with respect to a direction of information track extension and to a direction normal thereto.

The information track 201 is made of a number area 204 representing an information track number and a plurality of unit data areas 20.

Each unit data area 205 is constructed of 5 bits. Data to be stored is recorded on the optical card after being subjected to 4/5 conversion conforming to the conversion formula shown in Table and then to NRZI demodulation.

TABLE

| Data | Code |  |
|------|------|------|
|      | MSB  | LSB |
| 0 0 0 0 | 1 1 0 0 1 |
| 0 0 0 1 | 1 1 0 1 1 |
| 0 0 1 0 | 1 0 0 1 0 |
| 0 0 1 1 | 1 0 0 1 1 |
| 0 1 0 0 | 1 1 1 0 1 |
| 0 1 0 1 | 1 0 1 0 1 |
| 0 1 1 0 | 1 0 1 1 0 |
| 0 1 1 1 | 1 0 1 1 1 |
| 1 0 0 0 | 1 1 0 1 0 |
| 1 0 0 1 | 0 1 0 0 1 |
| 1 0 1 0 | 0 1 0 1 0 |
| 1 0 1 1 | 0 1 0 1 1 |
| 1 1 0 0 | 0 1 1 1 0 |
| 1 1 0 1 | 0 1 1 0 1 |
| 1 1 1 0 | 0 1 1 1 0 |
| 1 1 1 1 | 0 1 1 1 1 |

Figure 5:
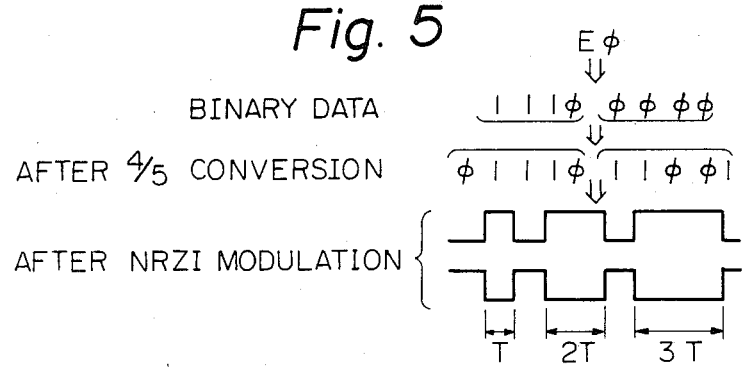
FIG. 5 illustrates the 4/5 conversion and NRZI modulation method used with the present embodiment.
Figure 6:
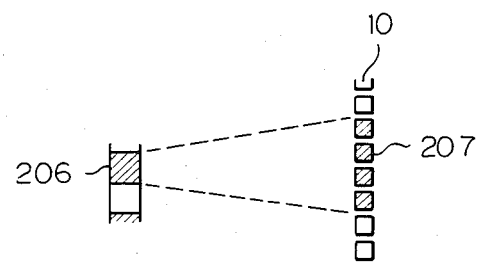
FIG. 6 shows an example of the interrelated record areas of the sensor array and optical card.

FIG. 5 illustrates an example of the 4/5 and NRZI modulation method used with the present invention. As shown in FIG. 5, hexadecimal data Eφ is subjected to 4/5 conversion and then to NRZI modulation. In this case, record signals after the NRZI modulation method contain only those signals having a duration of T, 2T or 3T. T represents the minimum transition period of a signal and corresponds to one bit in the record format of FIG. 4. That is, information recorded on the information track 201 does not contain a transition period of 4T or longer.

In view of the above, an area having a transition period of 4T is used in this embodiment as the separating area 202 for separating information tracks. For example, as shown in FIG. 4, two types of separating signals "100001" and "011110" are alternately recorded on the separating areas 202 of the adjacent information tracks in the readout direction or in the column direction of the information tracks. Obviously, it is not limited thereto but any separating signals may be recorded if they can be read and discriminated from track information.

The information track 201 includes the number area 204 of 5 bits and fifteen unit data areas 205, resulting in 80 bits in total. However, the information track 201 does not include a preamble area for obtaining a clock during reproduction. The 5 bit number area 204 repeatedly used 0 to 7 in hexadecimal, i.e., "11001" to "10111" after 4/5 conversion. There are two reason for this. One reason is that the number of bits used for the track number is small. The other reason is that since the MSBs of the codes of the track numbers after 4/5 conversion are all "1" and the NRZI modulation method is a method to invert the code only when it is "1", then it is possible to use both the LSB (sixth bit) of the separating area 202 and the MSB (first bit) of the number area 204 in common to thereby enable a reduction of the number of bits.

As above, the separating area 202 contains a code with the same consecutive digits not appearing in the information track 201, so that the detection of the R line is made without error. In addition, since the information track 201 does not contain a preamble area for picking up information reproduction clocks, the number of necessary bits, except data bits, is reduced. Therefore, it is possible to store more data.

Figure 1:
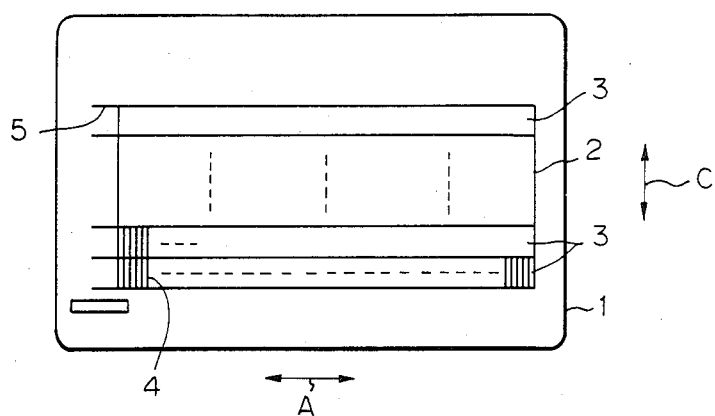
FIG. 1 schematically shows a plan view of a record format of a conventional optical card.
Figure 2:
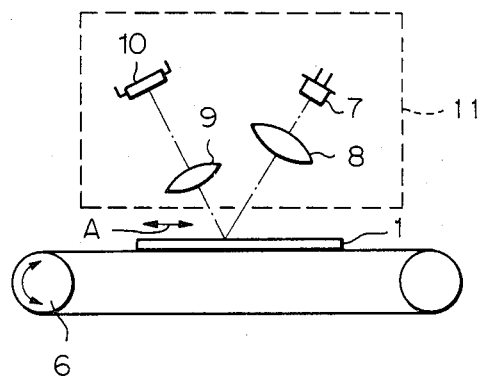
FIG. 2 schematically shows the construction of an optical card reproducing apparatus.
Figure 3:
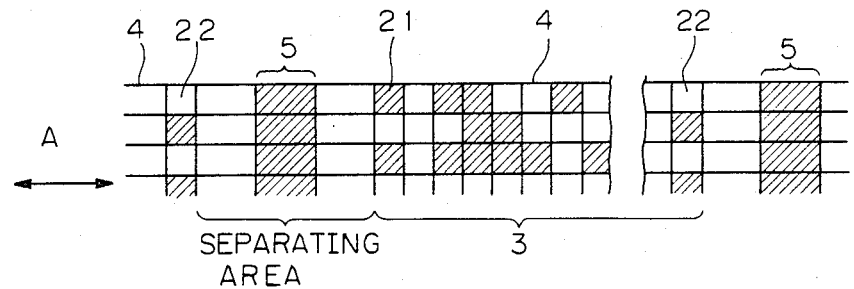
FIG. 3 schematically shows an enlarged portion of the conventional record format.

Next, an embodiment of the reproduction method for the information recording medium described above will be described. In this embodiment, an optical card is used as the information recording medium having the record format shown in FIG. 4, and the reproducing apparatus shown in FIG. 2 is used as the apparatus reading information from the optical card. In the embodiment, an optical magnification is set such that one bit 206 of the record area on the optical card is focussed onto four cells 207 of the linear sensor array 10. For example, assuming that the dimension of one bit 206 of the optical card is 10 μm and that of the L cell 207 of the linear sensor array 10 is 15 μm, it suffices if the optical focussing system 9 has a magnification of 4×15/10=6.

Figure 7:
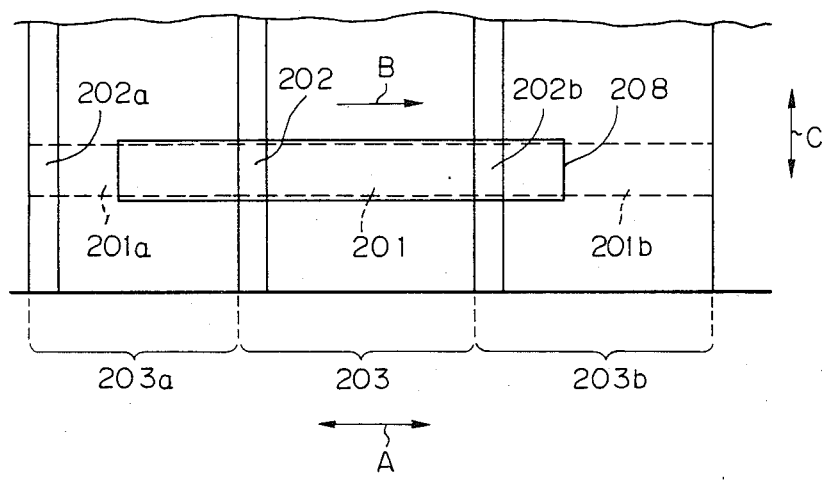
FIG. 7 is a schematic view for explaining an example of the reproduction method.

FIG. 7 is a schematic view illustrating the reproduction method for the information recording medium of the present invention. In the figure, there are formed on the record area of the optical card a band 203, bands 203a and 203b contiguous to the band 203, information tracks 201, 201a and 201b corresponding to the respective bands, and separating areas 202, 202a and 202b for separating the information tracks, respectively, in accordance with the record format of FIG. 4. The track in one band consists of 85 bits since one bit of the separating area (6 bits) and the information track (80 bits) are commonly used. Therefore, each band track is focussed on 340 cells 207 of the sensor array 10.

In this embodiment, a CCD having 512 cells 207 is used as the linear sensor array 10, and a readout area 208 is defined in such a way that portions of the information tracks 201a and 201b, as well as the information track 201, which is the object to be read, are focussed onto the sensor array 10.

By defining the readout area 208 as above, it is possible to pick up clocks during reproduction without additionally forming, on the objective information track 201, a preamble area for picking up clocks. In particular, as the sensor array 10 scans the readout area 208 in the direction of the arrow B, the reproduction clock is picked up using part of the information of the information track 201a. After detecting the separating area 202, information recorded on the information track 201 is reproduced in response to the picked-up clock. Upon detection of the separating area 202b, the information reproduction operation is terminated.

Next, a reproducing apparatus for practicing the reproduction method for the optical card of the present invention will be described.

Figure 8:
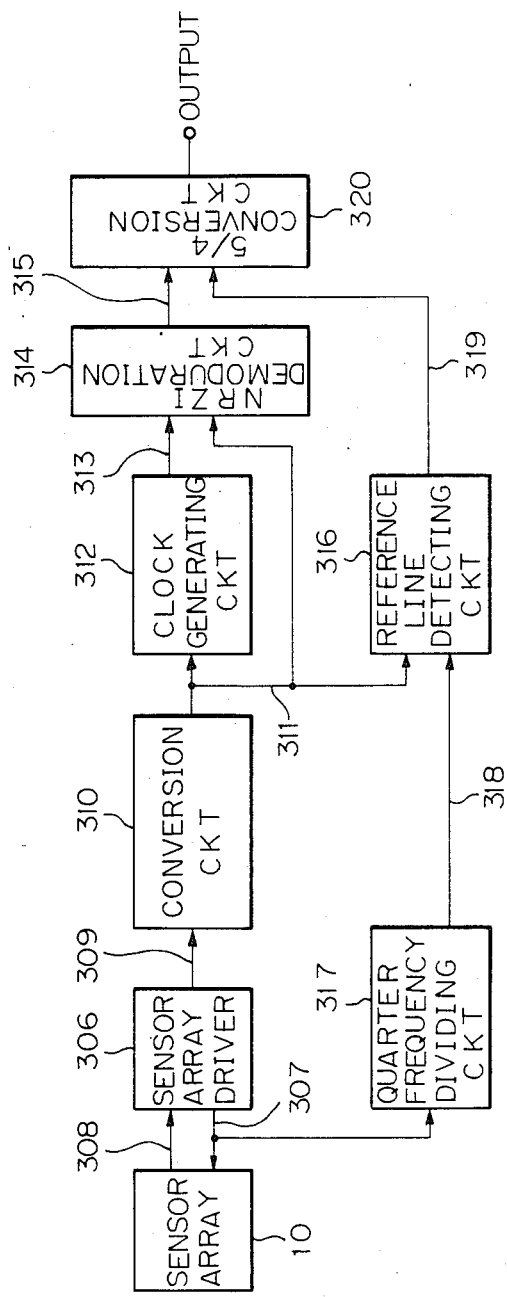
FIG. 8 is a block diagram of an optical card reproducing apparatus for practicing the reproduction method.

FIG. 8 is a block diagram of the optical card reproducing apparatus practicing the reproduction method. In the figure, the sensor array 10 with the defined readout area 208 is driven in response to drive clocks 307 from a sensor array driver 306. The output signal 308 from the sensor array 10 is amplified by the driver 306 and inputted as a video signal 309 to a conversion circuit 310 which converts the video signal to binary form. The binary video signal from the circuit 310 is inputted as an NRZI signal to a clock generating circuit 312, NRZI demodulation circuit 314 and R line detecting circuit 316, respectively.

The clock generating circuit 312 extracts from the NRZI signal 311 a clock signal 313 to output it to the NRZI demodulation circuit 314 which is inputted with the clock signal 313 and NRZI signal 311 and outputs a demodulated NRZ signal 315 to a 5/4 conversion circuit 320. The R line detecting circuit 316 is inputted with a clock signal from a quarter frequency dividing circuit 317 obtained through ¼ division of the drive clocks and the NRZI signal 311 from the conversion circuit 310, and outputs an R line detecting signal 319 to the 5/4 conversion circuit 320. The 5/4 conversion circuit 320 converts the NRZ signal 315 in response to the R line detecting signal 319.

Figure 9:
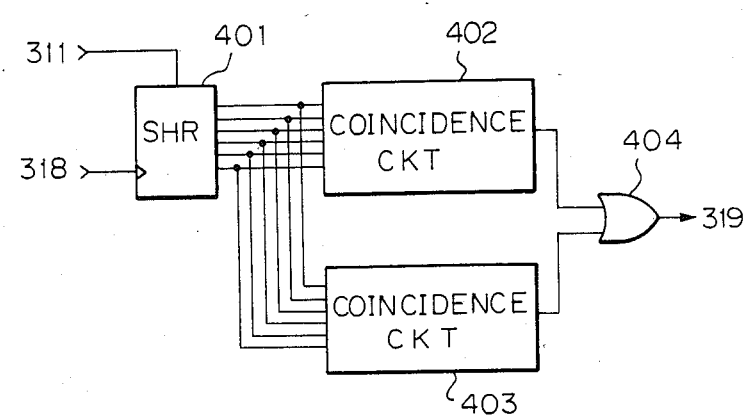
FIG. 9 is a block diagram of the reference line detecting circuit of FIG. 8.

FIG. 9 is a block diagram of the R line detecting circuit 316. In the figure, the NRZI signal 311 is inputted to the serial input terminal of a shift register 401, while the ¼-divided clock signal 318 is inputted to the clock input terminal thereof. The 6 bit, parallel output terminals of the shift register 401 are respectively connected to the input terminals of a "100001" coincidence circuit 402 and a "011110" coincidence circuit 403. The R line detecting signal 319 is outputted from an OR circuit 404 to the 5/4 conversion circuit 320.

The operation of the reproducing apparatus constructed as above will be described with reference to FIGS. 4 and 7.

As the sensor array 10 scans in response to the drive clocks 307 the readout area 208 in the direction of the arrow B, the NRZI signal 311 first obtained is a readout signal from part of information of the adjacent information track 201a. The readout signal theoretically includes, as described previously, only the inversion periods of T, 2T and 3T, so that the clock signal 313 can be generated by extracting the minimum inversion period T at the clock generating circuit 312 using a PLL circuit, etc. With this clock signal 313, the NRZI signal 311 is demodulated into the NRZ signal 315 at the NRZI demodulation circuit 314. In this case however, the 5/4 conversion circuit 320 will not become operative unless the R line detecting signal 319 is first inputted thereto. In particular, each bit signal from the readout area 208 is sequentially inputted to the shift register 401 of the R line detecting circuit 316 which therefore is always filled with a 6 bit signal. Consequently, the R line detecting signal 319 is outputted only when the storage content of the shift register 401 coincides with the record content of the separating area 202 or 202a, i.e., "100001" or "011110".

When 6 bit information (in this example, "100001") from the first separating area 202 is stored in the shift register 401, the R line detecting signal 319 is outputted via the coincidence circuit 402 from the OR circuit 404, thereby starting the conversion operation at the 5/4 conversion circuit 320. Thus, the NRZ signal 315 corresponding to the information of the objective information track 201 is subjected to 5/4 conversion and outputted as a reproducing signal.

Thereafter, when 6 bit information (in this example, "011110") from the next separating area 202b is stored in the shift register 401, the R line detecting signal 319 is outputted via the coincidence circuit 403 from the OR circuit 404, thereby stopping the 5/4 conversion circuit 320 to output a reproducing signal.

Information reproduction of the objective information track 202 is performed in response to the self-clocks as described above. A desired information track as an object to be thereafter read is selected by moving the optical card in the direction of arrow A and/or moving the optical head 11 with the sensor array 10 in the direction of arrow C, and the information of the desired information track is reproduced in a similar way as above described.

In this case, the scanning of the sensor array 10 and the relative movement of the optical card to the sensor array 10 are asynchronous. Therefore, sometimes it becomes necessary to scan one information track plural times, depending on a choice between the scan speed of the sensor array in the direction of arrow B and the speed of movement of the optical card in the direction of arrow A or arrow C. For example, assuming that the frequency F of the drive pulses 307 for the sensor array 10 having 512 cells is 10 MHz; the speed V of movement of the optical card is 40 mm/sec; and the dimension L of one bit of the optical card is 10 μm, the number of scans per one information track is $$S = \frac{L/V \text{(time needed to pass one information track)}}{L/F \times 512 \text{ (time needed to scan sensor array once)}} = 4.88$$

Therefore, it is necessary to determine when the optical card moves to a new information track.

Figure 10:
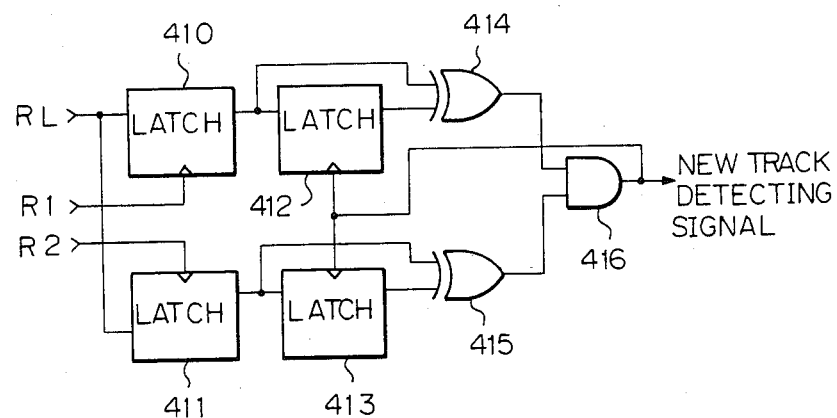
FIG. 10 is a lock diagram of a new track detecting circuit to be used for the optical card reproducing apparatus.

FIG. 10 is a block diagram of a new track detecting circuit to be used with the reproducing apparatus. In the figure, latch circuits 410 and 411 are inputted with a signal RL, e.g., a desired bit or bits of the parallel output terminals of the shift register 401. A latch pulse R1 of the latch circuit 410 is the first R line detecting signal 319 or a pulse corresponding in its timing to the signal 319. The latch circuit 410 latches in response to the latch pulse R1 the signal RL representative of the content of the first separating area 202. Further, a latch pulse R2 of the latch circuit 411 is the next R line detecting signal 319 or a pulse corresponding in its timing to the signal 319. The latch circuit 411 latches in response to the latch pulse R2 the signal RL representative of the content of the next separating area 202b. Latch circuits 412 and 413 maintain latching of the contents of the separating areas on both front and rear portions of the preceding objective information track. The outputs of the latch circuits 410 and 412 are inputted to an Exclusive OR circuit 414, whereas the outputs of the latch circuits 411 and 413 are inputted to an Exclusive OR circuit 415. The outputs of the Exclusive OR circuits 414 and 415 are inputted to an AND circuit 416 which outputs a new track detecting signal. The output of the AND circuit 416 also serves as a latch pulse for the latch circuits 412 and 413 to thereby latch the contents of the latch circuits 410 and 411 at the latch circuits 412 and 413, respectively.

As already discussed, "100001" and "011110" are alternately recorded as the content of the separating area in both the readout direction and in the column direction of the information tracks. Therefore, with the circuit construction as above, every time a new information track becomes involved, the contents of the latch circuits 410 and 412 are changed and those of the latch circuits 411 and 413 are changed. Thus, both outputs of the Exclusive OR circuits 414 and 415 become "1" to output a new track detecting signal from the AND circuit 416. In other words, an unrepresented control circuit is informed of the fact that the sensor array 10 is scanning a new information track.

In the above embodiment, the 4/5 conversion and NRZI modulation method has been incorporated. However, the present invention is also applicable to other modulation methods, such as MFM or EPF modulation methods, wherein a self-clocking operation is possible and an area for obtaining pertinent information reproduction is needed.

It is obvious that the adjacent area for use in picking up reproduction clocks may be the whole area of the adjacent information track or the area occupying a plurality of bands.

Further, the present invention is applicable to an optomagnetic recording medium wherein the magnetization direction is inverted, a recording medium using concavity (pit) and convexity (non-pit) bits or the like.

As seen from the detailed description of the information recording medium of the present invention, the area between adjacent information tracks in the readout direction of the information tracks can be efficiently utilized. Therefore, it is possible to increase the data storage capacity.

Further, a reliable discrimination between information tracks permits the prevention of an erroneous operation and readout error during reproduction.

What we claim is:

1. An optical card having a recording area on a card-shaped recording medium, comprising:

a plurality of information tracks for storing information to be recorded, said tracks being arranged in a direction of information sequence and a direction perpendicular thereto, said tracks arranged in the direction perpendicular to the information sequence direction forming a band, and a plurality of said bands being formed in the information sequence direction; and an area for separating and discriminating said information tracks from one another in respect of said two directions, said area being formed between the adjacent bands and constructed of a plurality of tracks arranged in the direction perpendicular to the information sequence direction, each of said tracks in said area one-to-one corresponding to each of said information tracks in the band adjacent to said area and containing a code not included in any of said information tracks, and said code being inverted in its content alternately between the adjacent tracks in said area.

2. An information recording medium comprising:

a plurality of information recording tracks for storing information to be stored, said information recording tracks being arranged in a direction of information sequence and a direction perpendicular thereto; and an area for separating and discriminating said information recording tracks from one another with respect to said two directions, said area being composed of predetermined pattern including a consecutive pattern other than that to be recorded in said information recording tracks and said predetermined pattern being alternately reversed in the arrangement direction thereof.

3. An information recording medium according to claim 2, wherein said predetermined pattern is alternately reversed to another predetermined pattern adjacent to said predetermined pattern in said direction of said information sequence.

4. An information recording medium according to claim 2, wherein said information recording tracks have an area indicating a track number, said area indicating said track number and said area for separating and discriminating being commonized.

5. An information recording medium comprising:

a plurality of information recording tracks for storing information to be stored in information pattern obtained by converting predetermined information by use of predetermined converting process being recorded in said information recording tracks and said information recording tracks being arranged into a direction of information pattern sequence and a direction perpendicular thereto; and an area for separating and discriminating said information recording tracks from one another with respect to said two directions, said area including a plurality of predetermined patterns arranged in said perpendicular direction and unable to be obtained by said predetermined converting process and said plurality of predetermined patterns being different from another pattern adjacent to said predetermined pattern in a direction of predetermined pattern arrangement.

6. An information recording medium according to claim 5, wherein said plural information recording tracks adjacent to each other in said perpendicular direction form a band and said area is positioned between said plural bands arranged in said direction of said information pattern sequence so as to separate the bands.

7. An information recording medium according to claim 6, wherein said separation and discrimination of said information recording tracks in said bands can be attained by making said predetermined pattern different from said another pattern adjacent to said predetermined pattern in said direction of said predetermined arrangement.

* * * * *